(12) United States Patent
Ahn

(10) Patent No.: US 8,843,421 B2
(45) Date of Patent: Sep. 23, 2014

(54) IDENTIFICATION OF ENTITIES LIKELY TO ENGAGE IN A BEHAVIOR

(75) Inventor: Junghoon Ahn, Cupertino, CA (US)

(73) Assignee: Accenture Global Services Limited, Dublin (IE)

( * ) Notice: Subject to any disclaimer, the term of this patent is extended or adjusted under 35 U.S.C. 154(b) by 500 days.

(21) Appl. No.: 13/286,645

(22) Filed: Nov. 1, 2011

(65) Prior Publication Data

US 2013/0110746 A1    May 2, 2013

(51) Int. Cl.
G06F 15/18    (2006.01)
G06N 99/00    (2010.01)

(52) U.S. Cl.
CPC ................................. *G06N 99/005* (2013.01)
USPC ........................................ 706/12; 705/14.25

(58) Field of Classification Search
None
See application file for complete search history.

(56) References Cited

U.S. PATENT DOCUMENTS

2003/0105658 A1*  6/2003  Chen et al. ...................... 705/10
2005/0251408 A1  11/2005  Swaminathan et al.
2008/0162688 A1*  7/2008  Reumann et al. ............. 709/224
2009/0105299 A1   4/2009  Bannen et al.
2010/0175129 A1   7/2010  Doddy et al.

FOREIGN PATENT DOCUMENTS

WO    WO 2009/105299 A2    8/2009

OTHER PUBLICATIONS

Brooks, R. R., Schwier, J. M. & Griffin, C. (2009). Behavior Detection Using Confidence Intervals of Hidden Markov Models . . . IEEE Transactions on Systems, Man, and Cybernetics, Part B, 39, 1484-1492.*
Examiner's First Report in Australian Patent Application No. 2012244286 issued on Dec. 13, 2012.
"Threshold Models of Collective Behavior", Granovetter, M., The American Journal of Sociology, vol. 83, No. 6 (May 1978), pp. 1420-1443.

* cited by examiner

*Primary Examiner* — Jeffrey A Gaffin
*Assistant Examiner* — David H Kim
(74) *Attorney, Agent, or Firm* — Harrity & Harrity, LLP

(57) ABSTRACT

To entities that are likely to engage in a behavior, a behavior discrimination threshold for each of a plurality of behavior variables is determined. Variable values for each entity of a plurality of target entities and for each of the behavior variables are compared to the relevant behavior discrimination threshold to provide identifying variables for each entity. An index value is determined for each of the plurality of target entities based on the identifying variables for that entity. An index threshold is determined such that those entities of the target entities having index values that meet or exceed the index threshold are likely to exhibit or engage in the behavior more frequently than a random sampling of the plurality of training entities. Actions designed to affect the likelihood that the resulting targeted entities will engage in the behavior may be directed to the targeted entities.

18 Claims, 5 Drawing Sheets

IDENTIFICATION OF ENTITIES LIKELY TO ENGAGE IN A BEHAVIOR

FIELD

The instant disclosure relates generally to the data-based analysis of the actions and/or characteristics of entities and, in particular, to the identification of entities likely to engage in a certain behavior.

BACKGROUND

Various organizations (such as business organizations, governments, etc.) have access to a rich variety of data concerning the actions and/or characteristics of entities. As used herein, an entity is typically a natural person but may also include collections of people or other organizations that are treated as a single unit (e.g., a family, small business, etc.). For such organizations, it is beneficial to be able to analyze such data (when legally permissible to do so) in order to determine the likelihood that a given entity or segment of entities is likely to engage in a certain behavior. As used herein, a behavior, i.e., a way that a given entity has or will behave, may be considered desirable (and, therefore, to be encouraged) or undesirable (and, therefore, to be discouraged) from the point of view of the organization performing the analysis.

For example, the strength of certain companies, such as subscriber-based service providers, are assessed by the rate of "churn", i.e., the rate at which subscribing entities end the provider-user relationship. Such companies are keen to identify entities having a likelihood of engaging in "churn" behavior before they do so, thereby providing these companies the opportunity to prevent this occurrence. On the other hand, companies often want to encourage other behaviors, e.g., subscription to new or ancillary services, with those entities likely to be receptive to such encouragement. Of course, the same concept may be equally applied to other organizations and those behaviors, whether "positive" or "negative", particularly applicable thereto.

Despite this need, many organizations lack the capabilities to perform the sophisticated analyses often used for this purpose. Even where such analytical resources are available, the lead time required to conduct such analyses often results in a loss of timing and relevancy, i.e., the window of time for an organization to identify and react to those entities likely to engage in a behavior may expire quickly.

SUMMARY

The instant disclosure describes techniques for identifying entities that are likely to engage in a behavior. Specifically, this is achieved by first determining a behavior discrimination threshold for each of a plurality of behavior variables. In an embodiment, the behavior discrimination thresholds are determined based on training data for a plurality of training entities. In this embodiment, based on the training data corresponding to that portion of the plurality of training entities that have engaged in the behavior, a distribution for each behavior variable is determined. Subsequently, and for each behavior variable, a value of the distribution delineating at least a portion of those training entities that have engaged in the behavior is selected as the behavior discrimination threshold. In yet another embodiment, the value of the distribution thus selected is equal to the mean value of the distribution extended by a delta value, such as a standard error of the distribution. In another embodiment, one or more of the behavior discrimination thresholds may be directly provided by one or more users, e.g., subject matter experts, or via other channels.

Regardless of the manner in which the behavior discrimination thresholds are determined, variable values for each entity of a plurality of target entities and for each of the plurality of behavior variables are compared to the relevant behavior discrimination threshold to determine whether a given entity satisfies (i.e., meets or exceeds) the behavior discrimination threshold. Those variables for which the corresponding behavior discrimination threshold is satisfied are designated as identifying variables for each entity. An index value is determined for each entity of the plurality of target entities based on the identifying variables for that entity. Thereafter, an index threshold is determined such that those entities of the plurality of target entities having index values that meet or exceed the index threshold are likely to exhibit or engage in the behavior more frequently than a random sampling of the plurality of training entities. In a further embodiment, the index threshold determination may be based on the targeted entities at least meeting the index threshold exhibiting the behavior at a rate that exceeds random by a desired factor. Regardless, based on the determined index threshold, entities at least meeting the index threshold can be identified such that one or more actions may be directed to the resulting targeted entities, which actions are designed to affect the likelihood that the targeted entities will engage in the behavior under consideration.

BRIEF DESCRIPTION OF THE DRAWINGS

The features described in this disclosure are set forth with particularity in the appended claims. These features will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
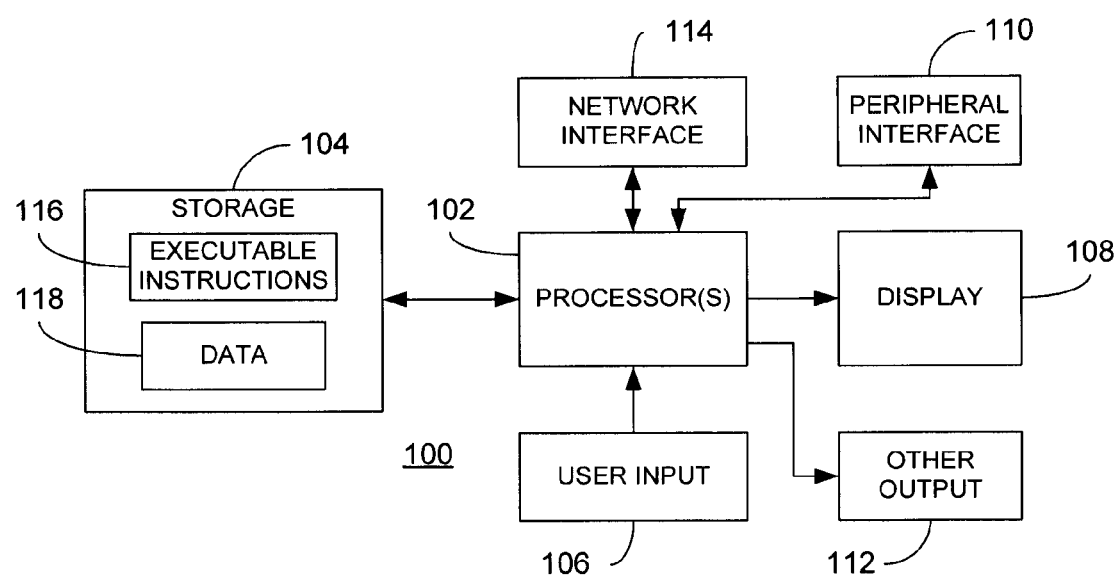
FIG. 1 is a block diagram of a processing device that may be used to implement the various embodiments described herein.

Referring now to FIG. 1, a representative processing device 100 that may be used to implement the teachings of the instant disclosure illustrated. The device 100 may be used to implement, for example, one or more components of the system 900, as described in greater detail below. Regardless, the device 100 comprises a processor 202 coupled to a storage component 104. The storage component 104, in turn, comprises stored executable instructions 116 and data 118. In an embodiment, the processor 102 may comprise one or more of a microprocessor, microcontroller, digital signal processor, co-processor or the like or combinations thereof capable of executing the stored instructions 116 and operating upon the stored data 118. Likewise, the storage component 104 may comprise one or more devices such as volatile or nonvolatile memory including but not limited to random access memory (RAM) or read only memory (ROM). Further still, the storage component 104 may be embodied in a variety of forms, such as a hard drive, optical disc drive, floppy disc drive, etc. Processor and storage arrangements of the types illustrated in FIG. 1 are well known to those having ordinary skill in the art. In one embodiment, the processing techniques described herein are implemented as a combination of executable instructions and data within the storage component 104.

As shown, the device 100 may comprise one or more user input devices 106, a display 108, a peripheral interface 110, other output devices 112 and a network interface 114 in communication with the processor 102. The user input device 106 may comprise any mechanism for providing user input (such as behavior discrimination thresholds, delta values, desired factors, etc. as described below) to the processor 102. For example, the user input device 106 may comprise a keyboard, a mouse, a touch screen, microphone and suitable voice recognition application or any other means whereby a user of the device 100 may provide input data to the processor 102. The display 108, may comprise any conventional display mechanism such as a cathode ray tube (CRT), flat panel display, or any other display mechanism known to those having ordinary skill in the art. In an embodiment, the display 308, in conjunction with suitable stored instructions 316, may be used to implement a graphical user interface capable of receiving user input as noted above. Implementation of a graphical user interface in this manner is well known to those having ordinary skill in the art. The peripheral interface 110 may include the hardware, firmware and/or software necessary for communication with various peripheral devices, such as media drives (e.g., magnetic disk or optical disk drives), other processing devices or any other input source used in connection with the instant techniques. Likewise, the other output device(s) 112 may optionally comprise similar media drive mechanisms, other processing devices or other output destinations capable of providing information to a user of the device 100, such as speakers, LEDs, tactile outputs, etc. Finally, the network interface 114 may comprise hardware, firmware and/or software that allows the processor 102 to communicate with other devices via wired or wireless networks, whether local or wide area, private or public, as known in the art. For example, such networks may include the World Wide Web or Internet, or private enterprise networks, as known in the art.

While the processing device 100 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the processing device 100 may include a greater or lesser number of components than those illustrated. Once again, those of ordinary skill in the an will appreciate the wide number of variations that may be used is this manner. Further still, although a single processing device 100 is illustrated in FIG. 1, it is understood that a combination of such processing devices may be configured to operate in conjunction (for example, using known networking techniques) to implement the teachings of the instant disclosure.

Figure 2:
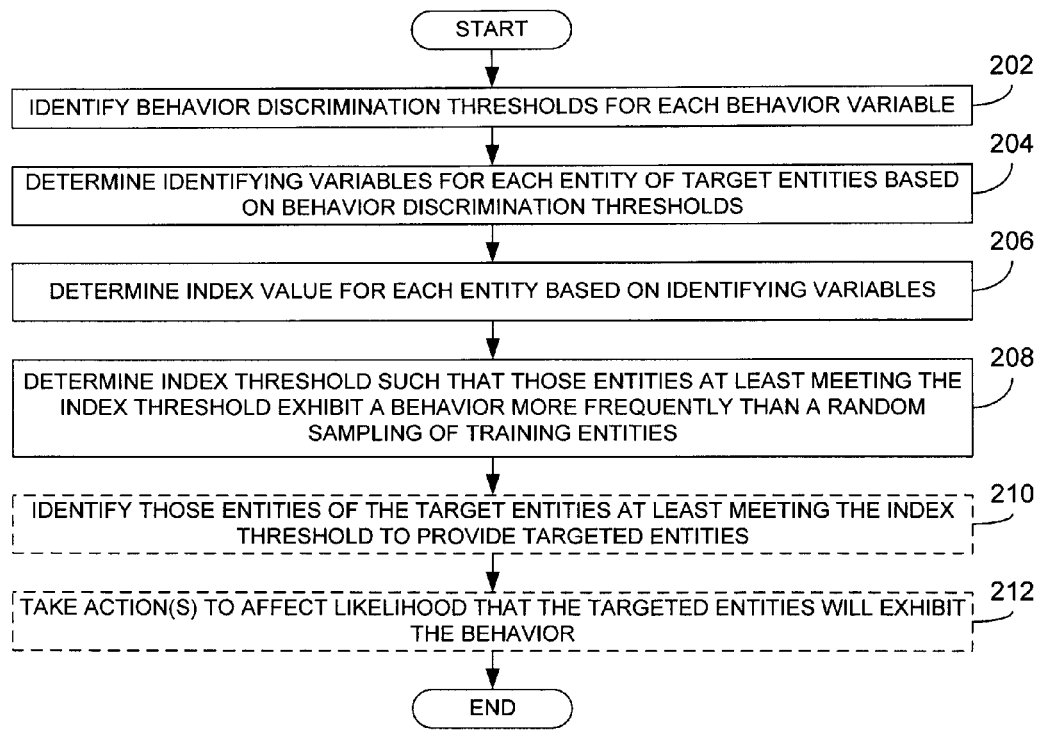
FIG. 2 is a flowchart illustrating processing in accordance with embodiment of the instant disclosure.

Referring now to FIG. 2, a flowchart illustrating processing in accordance with the instant disclosure is further illustrated. As noted above, the processing illustrated in FIG. 2 may be implemented, at least in part, using the processing device 100 or equivalents thereof. Regardless, the processing begins at block 202 where behavior discrimination thresholds are identified for each of a plurality of behavior variables. As used herein, a behavior variable comprises an action or characteristic, i.e., an attribute, applicable to a plurality of entities and capable of being quantified or measured. For example, in the context of a telecommunications service provider, such behavior variables may include those listed in Table 1 below. Note that all variables are measured on a monthly basis unless indicated otherwise.

TABLE 1

| | BEHAVIOR VARIABLE | DESCRIPTION |
|---|---|---|
| 1 | Total minutes used | The total number of minutes of service used by the entity. |
| 2 | Text message overage amount | Number of minutes by which a user exceeds his/her plan. |
| 3 | Total bill amount | Total dollar amount billed to the entity for all services provided |
| 4 | Total overage minutes | Total number of minutes of service used by the entity in excess of the pre-defined quota of minutes |
| 5 | Credit given amount | Total dollar amount given back to the entity as form of deferred payment |
| 6 | Total overage amount | Total dollar amount charged to the entity for all excess usages outside pre-defined usage quota |
| 7 | Data usage | The number of kilobytes used by an entity. |
| 8 | Off-peak voice usage amount | Number of minutes used by the entity during off-peak usage times |
| 9 | Casual text messaging | Number of text messaging used by an entity not having a pre-defined text messaging quota |
| 10 | Total text messaging | Total number of text messaging services, incoming and outgoing, used by the entity |
| 11 | 3 months average minutes | Average number of minutes of total service used by the entity across 3 calendar-month period |
| 12 | 3 months voice minutes | Average number of voice minutes used by the entity across 3 calendar-month period |
| 13 | 3 months discount totals | Average dollar amount given to the entity as a discount on the provided services across 3 calendar-month period |

TABLE 1-continued

| BEHAVIOR VARIABLE | DESCRIPTION |
|---|---|
| 14 International calls | Number of minutes used by the entity on international calls. |
| 15 Adjustment amount | Dollar amount adjusted from original billed amount as a reconciliation of erroneous charge |
| 16 In-network voice usage | Number of voice minutes used within same network provider |
| 17 Average minutes per call | The average number of minutes the entity uses for across all types of calls. |
| 18 Bad debt past 6 months | Total amount of delinquent amount unpaid by the entity for the last 6 months |
| 19 Bad debt past 12 months | Total amount of delinquent amount unpaid by the entity for the last 12 months |
| 20 Bad debt to date | Total amount of delinquent amount unpaid by the entity for the duration of entire provider-user relationship |
| 21 Rebate amount | Total dollar amount provided to the entity as a rebate for purchase(s) of product(s) and/or service(s) |
| 22 Rebate count | Number of rebates provided to the entity for purchase(s) of product(s) and/or service(s) |
| 23 IVR calls | Number of calls to an interactive voice response system |
| 24 Time spent on CARE | Number of minutes the entity spent on customer care/customer support |

Those having ordinary skill in the art will appreciate that the behavior variables listed in Table 1 are merely examples of the types of variable that could be employed by the techniques of the instant disclosure in the context of telecommunication service providers. Furthermore, the types of variables used are necessarily dependent upon the nature of the organization seeking to analyze the entities in question, e.g., an airline will likely look at entirely different variables relevant to its customers. In an embodiment, suitable behavior variables are identified by one or more persons having knowledge of which variables are likely to serve as the best predictors of a given behavior. Alternatively, using the techniques described herein, the accuracy of each of a plurality of variables may be assessed on an ongoing basis (using control groups within the targeted entities for comparison) such that only those variables that currently provide the greatest accuracy in predicting the given behavior are used. For example, whereas variables 1-24 in Table 1 above may most effective in predicting "churn" behavior, an subset of those variables, or some other set of variables entirely, or some combination thereof, may serve as better predictors of some other behavior. Furthermore, although variables 1-24 may be effective for "churn" behavior currently, that may change over time such that other behavior variables will supersede these. Regardless of the specific behavior variables used, the behavior discrimination thresholds determined at block 202 are provided to discern differences as clearly as possible between entities that do and do not exhibit or engage in a given behavior.

In an embodiment, at least one of the behavior discrimination thresholds may be provided by one or more users, e.g., the same users responsible for selecting the plurality of behavior variables. In this case, the user providing the behavior discrimination threshold(s) will typically have sufficient knowledge regarding the overall behavior of the entities in question as to be able to determine a threshold that discriminates with relatively high probability that a given entity will or will not engage in a given behavior. In this case, the behavior discrimination threshold(s) thus provided may be received via an appropriate user input mechanism such as those described relative to FIG. 1 above.

In another embodiment, the behavior discrimination thresholds may be systematically identified based on training data attributable to a plurality of training entities, i.e., entities selected from the entirety of the organization's relevant entity population for the purpose of establishing the behavior discrimination thresholds. This is illustrated in greater detail with reference to FIGS. 3-6.

Figure 3:
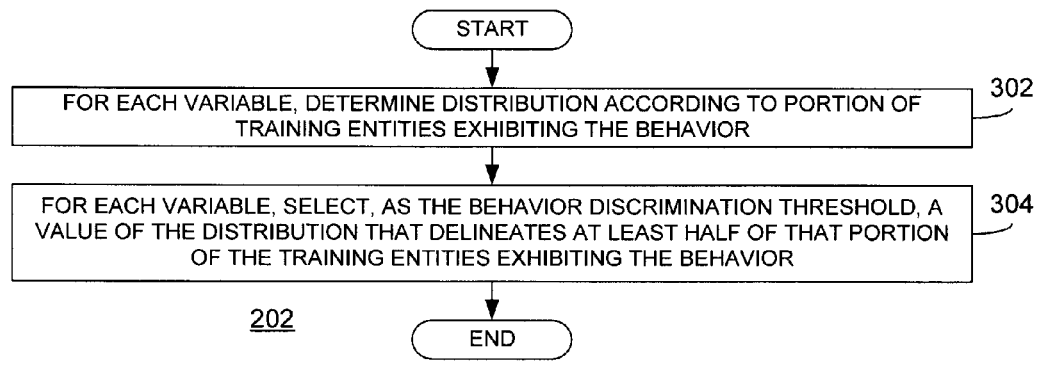
FIG. 3 is a flowchart illustrating an exemplary embodiment of a portion of the processing from FIG. 2 in greater detail.
Figure 4:
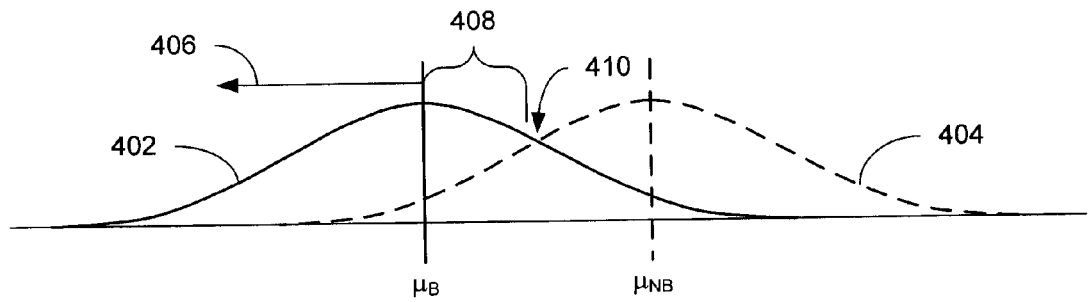
FIGS. 4-6 are diagrams illustrating various embodiments for determining and employing behavior discrimination thresholds in accordance with the instant disclosure.
Figure 5:
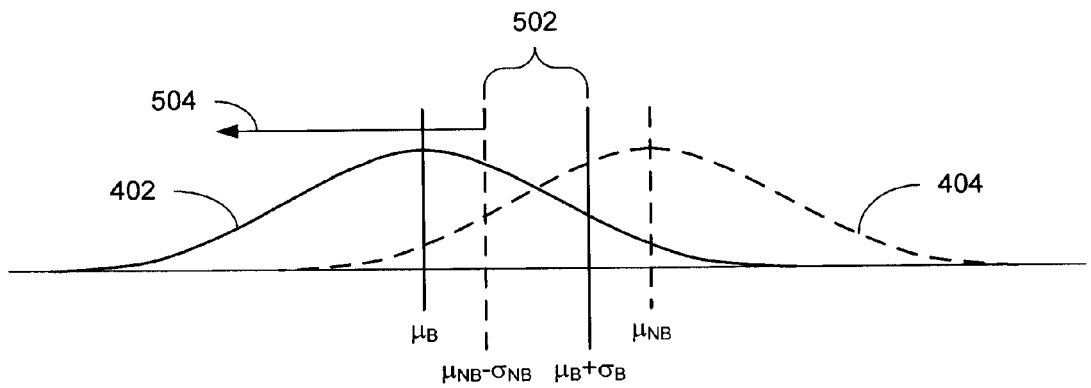
Figure 6:
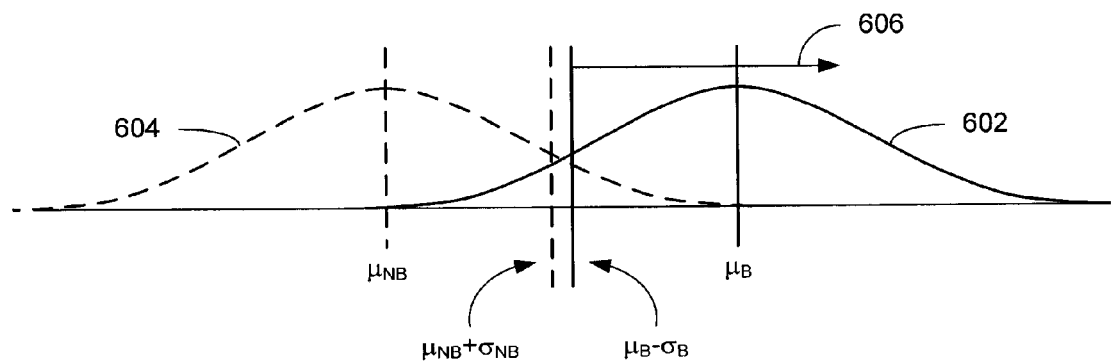

FIG. 3 illustrates an embodiment of the processing illustrated in block 202 of FIG. 2. Beginning at block 302, a distribution for each of the plurality of behavior variables is determined based on training data associated with the plurality of training entities. In particular, distributions corresponding to those entities of the plurality of training entities that do (and, optionally, that do not) exhibit or engage in the behavior in question are determined. Examples of such distributions 402, 404, 602, 604 are illustrated in FIGS. 4-6. In the illustrated examples, the distributions are represented as frequency distributions with each point along the horizontal access representing a discrete value taken by the variable in question, with the vertical axis representing the frequency with which the corresponding value occurs. In the convention of FIGS. 4-6, distributions corresponding to entities exhibiting or engaging in the behavior under question are illustrated as solid lines, whereas those optional distributions corresponding to entities the do not exhibit or engage in the behavior are illustrated by dashed lines. Tools for creating such distributions, such the "SAS" statistical software package offered by SAS Institute Inc., are well known to those having ordinary skill in the art.

Referring once again to FIG. 3, having determined the distributions, processing continues at block 304 where, for each behavior variable, a value of that variable's distribution is selected as the behavior discrimination threshold, which value delineates at least a portion of those training entities exhibit or engaging in the behavior in question. An example of this is illustrated in FIG. 4, where the distribution 402 corresponding to that portion of the training entities exhibiting the behavior is illustrated. As known in the art, a mean value ($\mu_B$) can be determined for the distribution 402. In this case, then, the mean value can be selected as the behavior discrimination threshold such that at least a portion of the distribution 402 (including the mean value) is delineated, as indicated by arrow 406. In the case of an ideal Gaussian distribution, selection of the mean value (inclusive thereof) will delineate at least half of the relevant population. However, in practice, it is understood that distributions will not always be ideally symmetrical. As used herein, the delineation of entities means to identify that portion of the entities exhibiting (or not, as required by the particular application) the behavior that are most likely to exhibit the behavior. Thus, in the illustrated example, because the distribution 404 of those entities not exhibiting the behavior has a mean value ($\mu_{NB}$) greater than the first distribution 402, those entities most likely to exhibit the behavior are represented by those values along the distribution 402 less than or equal to the first distribution mean, $\mu_B$. In the opposite situation, where it is desired to discriminate those entities least likely to engage in the behavior (or, stated alternatively, most likely to not engage in the behavior), the second distribution 404 would be employed such that the non-behavior mean, $\mu_{NB}$, would be selected as the behavior discrimination threshold to delineate those values of the second distribution 404 greater than the non-behavior mean.

As illustrated in FIG. 4, while the mean value is a quick way to identify, for each variable, at least a portion of those entities exhibiting the behavior (or not, again, as the case may be), there may be a substantial number of entities on the other side of the behavior discrimination threshold that could be beneficially included in the analysis. For example, as illustrated in FIG. 4, a substantial portion 408 of the first distribution 402 greater than the mean, $\mu_B$, is still more likely to correspond to an entity exhibiting the behavior despite the overlap with the second distribution 404. In this case, it may be desirable to extend the mean value by a delta value in a direction that would cause a greater number of entities to be delineated (i.e., included). For example, using the concept of a standard error ($\sigma$) as known in the art, the behavior discrimination threshold can be extended as further illustrated in FIGS. 5 and 6 and described below. By extending the discrimination threshold by a standard error past the mean value, for example, the potential number of entities included can be increased from 50% to more than 84%. Although a standard error is one way to extend the behavior discrimination threshold beyond the simple mean value of a given distribution, those having ordinary skill in the art will appreciate that other delta values, such as multiples of the standard error, distribution crossover points (e.g., point 410), etc., could also be used to extend the discrimination threshold beyond the mean.

Specific examples of the determination of suitable delta values are illustrated in FIGS. 5 and 6 where the particular delta value chosen depends on orientation of (i.e., which distribution mean is greater than the other) and the degree of overlap between distributions for those entities that do and do not exhibit the behavior. For example, FIG. 5 illustrates the previously described distributions 402, 404 and further illustrates a standard error of the first distribution 402 greater than the corresponding mean (labeled $\mu_{NB}+\sigma_{NB}$) and a standard error of the second distribution 404 less than the corresponding mean (labeled $\mu_{NB}-\sigma_{NB}$). Together, these standard errors define a partial overlap region 502. In this case, assuming one wants to delineate those entities exhibiting the behavior, selecting the standard error of the first distribution, $\mu_B+\sigma_B$, as the delta value for the behavior-associated mean, $\mu_B$, would result in the inclusion of a substantial number of entities from the first distribution 402 that are actually less likely to exhibit the behavior than other entities having similar values for this variable that do not exhibit the behavior. In this case, then, in order to avoid such over-inclusion of entities, the standard error for the second distribution, $\mu_{NB}-\sigma_{NB}$, may be used as the delta value of the behavior-associated mean, $\mu_B$. In this manner, the resulting behavior discrimination threshold is upper-bounded, as indicated by arrow 504, so as to ensure inclusion of only those entities that are more likely to exhibit the behavior than those that are not. Although not explicitly illustrated in FIG. 5, the opposite situation can be equally defined, i.e., in the case where it is desired to delineate entities that do not exhibit the behavior. In this case, with reference to FIG. 5, in order to not over include entities, the standard error for the first distribution, $\mu_B+\sigma_B$, may be used as the delta value of the non-behavior-associated mean, $\mu_{NB}$.

FIG. 6 illustrates a related example in which the separation of the mean values, $\mu_B$ and $\mu_{NB}$, of the respective distributions 602, 604 is such that their corresponding standard errors do not create an overlap region. In this case, the lack of overlap indicates that each mean's standard error can be used as the delta value without over-inclusion of entities. In the example of FIG. 6, it is noted that the orientation of the distributions 602, 604 has been switched. Thus, in the case where it is desired to delineate those entities that exhibit the behavior, the delta value may be selected as the standard error associated with and less than the behavior-associated mean, $\mu_B$, illustrated as $\mu_B-\sigma_B$. Once again, the appropriate delta value for the opposite scenario (where it is desired to delineate those entities that do not exhibit the behavior) may likewise be determined, i.e., as the standard error associated with and greater than the non-behavior-associated mean, $\mu_{NB}$, illustrated as $\mu_{NB}+\sigma_{NB}$.

Regardless of the manner in which the behavior discrimination thresholds are determined for each behavior variable, and with reference once again to FIG. 2, processing continues at block 204 where variable values for each entity are compared to the relevant behavior determination thresholds for the plurality of behavior variables to determine whether each behavior variable can be identified as an identifying variable for each entity. As a simplified example, Table 2 below illustrates variable values for different entities, labeled Entity 1-4, along with the corresponding behavior discrimination thresholds for each of four different behavior variables, labeled Variables A-D.

TABLE 2

| | VARIABLE A | VARIABLE B | VARIABLE C | VARIABLE D | INDEX VALUE |
|---|---|---|---|---|---|
| Threshold | less than or equal to 20 | greater than or equal to 150 | greater than or equal to 2000 | less than or equal to 230 | — |
| Entity 1 | 17.2 | 140 | 1745 | 255 | 1 |
| Entity 2 | 23 | 152.8 | 2289 | 210 | 3 |
| Entity 3 | 25.3 | 164.9 | 1965 | 189.4 | 2 |
| Entity 4 | 15.6 | 172.3 | 2038 | 221.7 | 4 |

As shown by the boldfaced variable values, each of the entities may meet or exceed various ones of the behavior discrimination thresholds. As used herein, a threshold may be "exceeded" depending on the orientation of the threshold, i.e., "less than" or "greater than", such that a value that is less than a "less than" threshold is considered to exceed that threshold, whereas a value that is greater than a "greater than" threshold is considered to exceed that threshold. In the illustrated example, those values meeting or exceeding the corresponding thresholds are shown in boldfaced text. Thus, Entity 1 meets or exceeds the threshold for Variable A, such that Variable A is now considered to be an identifying variable for Entity 1; Entity 2 meets or exceeds the threshold for Variables B-D, such that Variables B-D are now considered to be identifying variables for Entity 2; Entity 3 meets or exceeds the threshold for Variables B and D, such that Variables B and D are now considered to be identifying variables for Entity 3; and Entity 4 meets or exceeds the threshold for Variables A-D, such that Variables A-D are now considered to be identifying variables for Entity 4.

Having thus determined which of the plurality of behavior variables are identifying variables for each entity, processing continues at block 206 where an index value is determined for each entity of a plurality of target entities based on the identifying variables for each entity. As used herein, the plurality of target entities are those entities selected from the entirety of the organization's relevant entity population for the purpose of attempting to identify those entities like to exhibit or engage in the behavior (or not, as desired). In one embodiment, the index value for each entity is the number of identifying variables for the entity. For example, with reference to Table 2 above, the index value for Entity 1 is 1, the index value for Entity 2 is 3, the index value for Entity 3 is 2 and the index value for Entity 4 is 4. By making the index value equal to the number of identifying variables for each entity, the determination of index values is reduced to a simple addition operation. However, it is anticipated that more complex formulations may be employed for determining index values. For example, rather than totaling up the number of identifying variables, it may be desirable to weight each variable according to the relative predictive "strength" of each variable. For example, if it is known that Variable A is a strong predictor of the behavior in question (and it is desired to delineate those entities exhibiting that behavior), then it may be assigned a higher weight than the other variables. Likewise, if it is known that Variable B is a comparatively weak (but nevertheless useful) predictor of the behavior in question (and still assuming that it is desired to delineate those entities exhibiting that behavior), then it may be assigned a lower weight than the other variables. In this embodiment, the strength or weakness of a given variable may be based on one or more statistical features of the variable. For example, a variable having behavior-associated and non-behavior-associated distributions (e.g., distributions 402, 404) having relatively large standard errors and means separated by a relatively small distance (i.e., $|\mu_B - \mu_{NB}| < d$), thus indicating greater likelihood of significant overlap, may be assigned a relatively lower weight to the extent that the variable is a lesser contributor to discerning entities one way or the other. In contrast, a variable having behavior-associated and non-behavior-associated distributions having relatively small standard errors and means separated by a relatively large distance, thus indicating little or no significant overlap, may be assigned a relatively higher weight to the extent that the variable is a greater contributor to discerning entities one way or the other.

Figure 7:
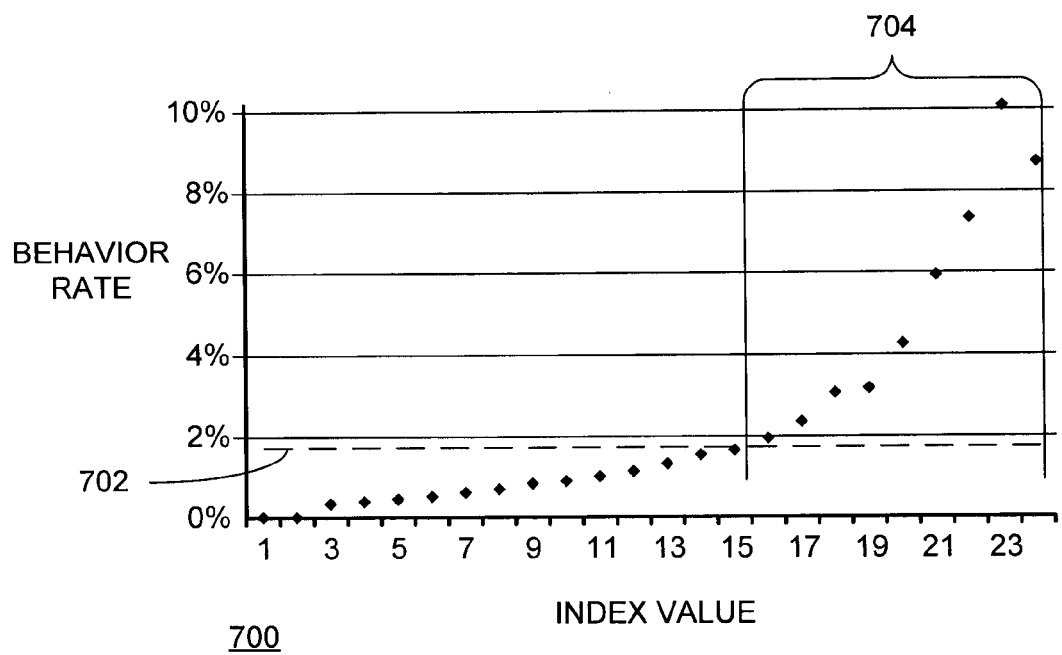
FIG. 7 is a chart illustrating an example of use of an index threshold in accordance with the instant disclosure.

Regardless of the manner in which the index values for each entity are determined based on the identifying variables, processing continues at block 208 where an index threshold is determined such that those entities of the plurality of target entities at least meeting the index threshold are likely to exhibit the behavior more frequently than a random sampling of the plurality of training entities. In practice, this is accomplished based on a comparison of index values for the plurality of training entities to a random selection of those same training entities. That is, using the methods described above for determining index values, an index value is determined for each of the plurality of training entities. For each of the possible index values, a rate of the behavior in question is determined for the corresponding training entities. An example of this is illustrated in FIG. 7, which illustrates a chart 700 showing index thresholds and corresponding behavior rates based on the plurality of training entities. Specifically, the chart 700 illustrates a behavior rate 702 for a random sample of the plurality of training entities, assumed in this example to be approximately 1.9%. By comparison, those training entities having index values less than 16 are seen to exhibit or engage in the behavior less than the rate 702 for the random sample. Thus, selection of entities have scores less than 16 would not be a very effective strategy for addressing the behavior (assuming the population of interest are those likely to exhibit or engage in the behavior) since, in this example, such entities are no more likely than a random sample to exhibit or engage in the behavior. In contrast, those entities having index values greater than or equal to 16 have behavior rates that at least meet or exceed the rate 702 for the random sample. As shown by reference numeral 704, those entities having index values greater than or equal to 16 are good candidates to exhibit or engage in the behavior and, thus, are likely good targets of efforts to discourage (or encourage, as the case may be) the behavior in question. By subsequently applying the index threshold to the plurality of target entities, the knowledge gained through the analysis of the plurality of training entities indicates that those entities of the plurality of target entities at least meeting or exceeding the index threshold are likely to exhibit the behavior at a rate greater than a random sampling of the same entities.

Having thus identified the index threshold, and with reference once again to FIG. 2, processing may optionally continue at block 210, where those entities of the plurality of target entities at least meeting or exceeding the index threshold are identified to provide targeted entities. As described above, those target entities meeting or exceeding the index threshold are most likely to exhibit or engage in the behavior in question in comparison with a random selection of the same plurality of target entities. In an embodiment, it may be desirable to further refine the targeted entities, particularly where the total population of the plurality of target entities is relatively large, i.e., in the hundreds of thousands or even millions. Specifically, it may be desirable to balance the population size of the targeted entities relative to the cumulative rate at which the targeted entities can be expected to exhibit or engage in the behavior in question. For example, it may be desirable to identify those entities of the plurality of target entities whose cumulative behavior rate (i.e., the behavior rate for all of those entities less than or equal to a given index value as measured by the index values for the plurality of training entities, as noted above) that exceed the rate of the random sample 702 by a desired factor. An example of this is illustrated in FIG. 8.

Figure 8:
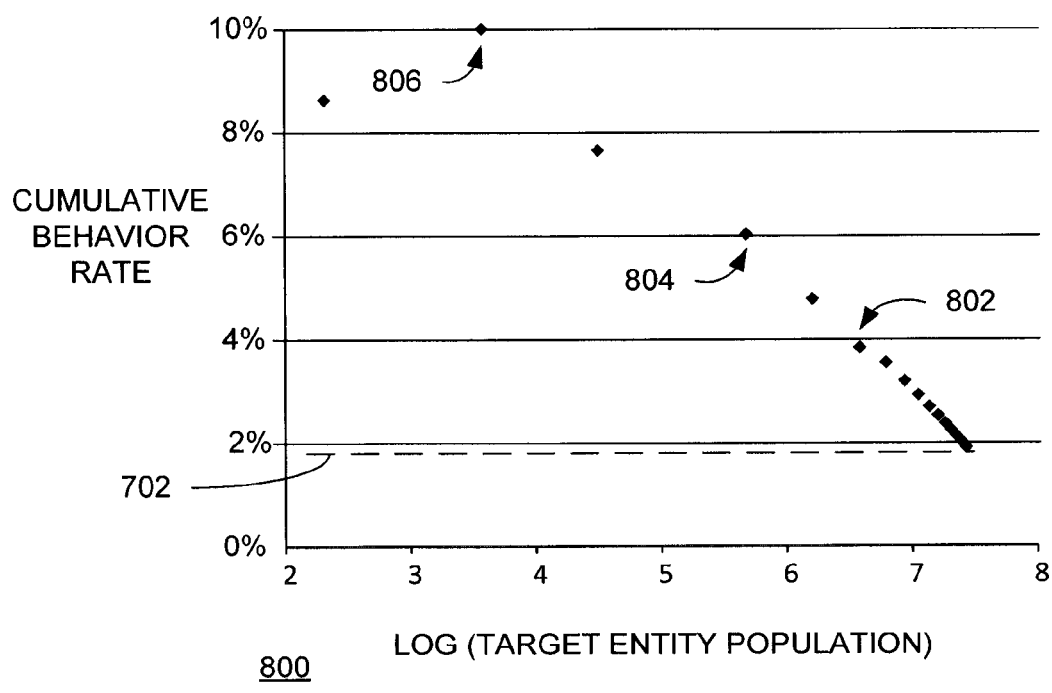
FIG. 8 is a chart illustrating an example use of index values to determine the likelihood of a given behavior for various populations in accordance with the instant disclosure.

FIG. 8 is a chart 800 illustrating the target entity population (expressed in log units) along the horizontal axis and the corresponding cumulative behavior rates for each of a variety of index values in comparison with the rate of the random sample 702. In this example, it is once again assumed that the random sample has a behavior rate of approximately 1.9%. If one wants to exceed the random rate 702 by a factor of 2, then that index value indicated by point 802 (corresponding to index value 19 in FIG. 7) would be used to identify the targeted entities. Note that the total population of targeted entities would be, in this case, approximately 3,900,000 entities. To exceed the random rate 702 by a factor of 3, then that index value indicated by point 804 (corresponding to index value 21 in FIG. 7) would be used to identify the targeted entities. Note that the total population of targeted entities would be, in this case, approximately 479,000 entities. As a final example, to exceed the random rate 702 by a factor of 5, then that index value indicated by point 806 (corresponding to index value 23 in FIG. 7) would be used to identify the targeted entities. Note that the total population of targeted entities would be, in this case, approximately 3,700 entities. In light of these examples, it will be evident that selection of the targeted entities can be based not only on a desired factor by which the random rate 702 is to be exceeded, but can also be based on selection of a desired population size of the targeted entities, or both.

Referring once again to FIG. 2, having identified targeted entities, processing may continue at block 212 where actions are undertaken relative to the targeted entities to affect the likelihood that the targeted entities will exhibit or engage in the behavior in question. In an embodiment, such actions may be undertaken by the organization, which actions could take a variety of forms depending on the behavior in question. For example, where the behavior in question is customer "churn" as described above, the organization (service provider) may take actions designed to decrease the likelihood that the targeted entities will discontinue the service. For example, various incentives such as discounted or special services, service credits, preferred services (e.g., early device upgrade), dedicated customer support, prioritized interactive voice response (IVR) routing, etc. could be offered to decrease the chance that a given entity of the targeted entities will discontinue the service. Oppositely, where it is desired to encourage a given behavior, the actions directed to the targeted entities would be tailored accordingly. Once again, those having ordinary skill in the art will appreciate that the actions taken will be highly dependent upon the nature of the behavior to be affected as well as the specific domain of activity relevant to the organization undertaking the analysis, and that the instant disclosure is not limited in this regard.

Figure 9:
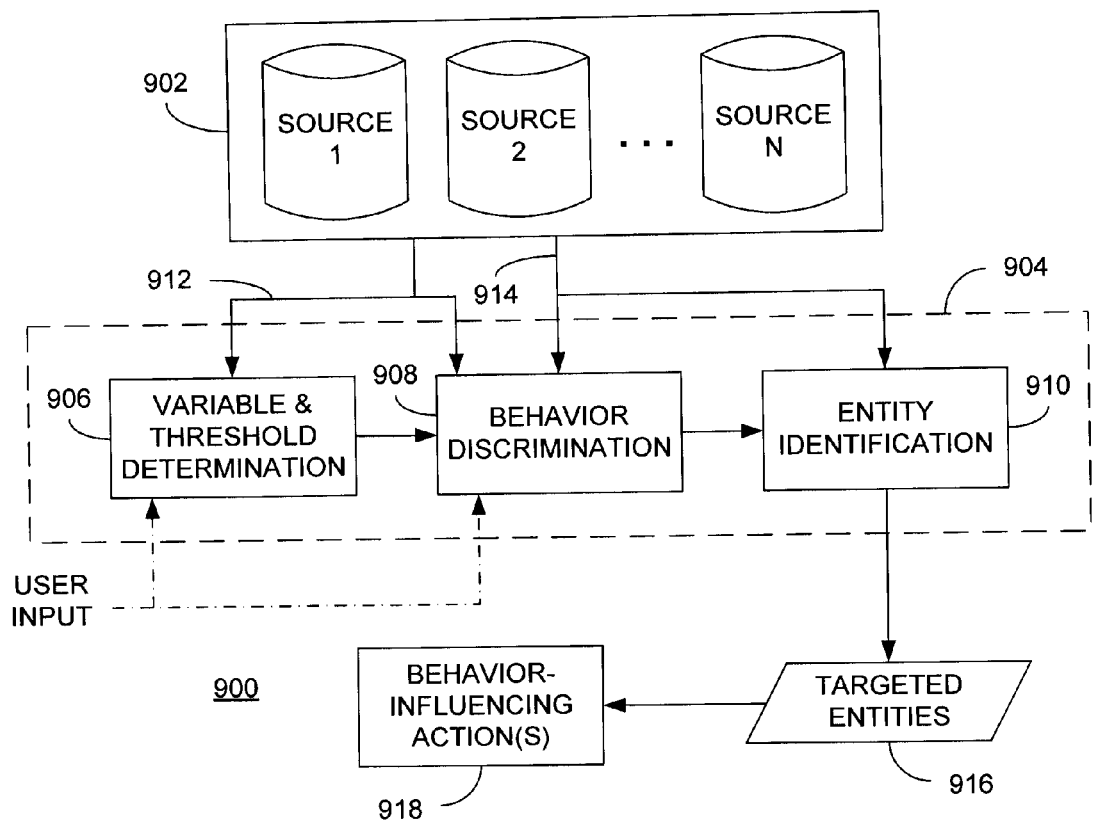
FIG. 9 illustrates an example of an apparatus in accordance with the instant disclosure.

Reference is now made to FIG. 9 where an apparatus 900 in accordance with the instant disclosure is illustrated. In practice, the apparatus 900 may be implemented, at least in part, using the processing device 100 or equivalents thereof. In particular, the apparatus 900 comprises data sources 902 (including, in this example, up to N different data sources) operatively connected to a behavior identification processor 904. As shown, an output of the behavior identification processor 904 is the targeted entities 916 that may then be subjected to one or more behavior-influencing action 918. In an embodiment, the data sources 902 may be implemented by one or more data storage server computer or the like, which servers can be co-located (as in the case of a so-called server farm) or geographically diverse. For example, one server could store data regarding specific actions taken by entities (e.g., accessing an IVR system, booking tickets via an on-line interface, etc.), another server could store data regarding specific interactions with entities (e.g., customer service calls, marketing campaigns directed to entities, etc.) and yet another server could be used to store data regarding specific transactions with entities (e.g., payment history, usage rates of certain services, etc.). Of course, such data may also be consolidated into a fewer number of sources as a matter of design choice. Once again, the number and nature of the specific sources 902 employed by the apparatus 900, as well as the specific data stored thereon, will necessarily depend on specific application.

The behavior identification processor 904 may comprise one or more processing devices, as described above. In the illustrated embodiment, the behavior identification processor 904 implements a variable and threshold determination component 906, a behavior discrimination component 908 and an entity identification component 910. Those having ordinary skill in the art will appreciate that the functions implemented by the illustrated components 906-910 could be combined into a lesser number of components or further sub-divided into a greater number of components. As illustrated by the dotted/dashed line, user input may be provided (via, for example, the user inputs 106) to the variable and threshold determination component 906 and the behavior discrimination component 908. The variable and threshold determination component 906 receives the training data for the plurality of training entities 912 and determines the behavior discrimination thresholds as described above. To this end, the user input provided to the variable and threshold determination component 906 may include specific threshold values (i.e., manually provided behavior discrimination thresholds), identifications of specific behavior variables to be used as well as the type of delta value to be used.

Regardless, the behavior discrimination thresholds determined by the variable and threshold determination component 906 are provided to the behavior discrimination component 908, which also receives as input the training data for the plurality of training entities 912 as well as data for the plurality of target entities 914. Note that, in practice, the training and/or target entities are identified using conventional database retrieval techniques. As described above, the behavior discrimination component 908 assigns index values to entities and further determines the index threshold. User input to the behavior discrimination component 908 may include a desired factor or population to be used when identifying the index threshold as described above. The resulting index threshold is provided to the entity identification component 910 that also receives the plurality of target entities 914 and, as described above, determines the targeted entities 916.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method for identifying entities likely to engage in a behavior, the method comprising:
    identifying a behavior discrimination threshold for each variable of a plurality of behavior variables;
    for each entity of a plurality of target entities and for each variable of the plurality of behavior variables, determining, by a processing device, that a variable value of the entity satisfies the behavior discrimination threshold for the variable to thereby identify the variable as an identifying variable for the entity;
    for each entity of the plurality of target entities, determining, by the processing device, an index value for the entity according to the identifying variables for the entity; and
    determining, by the processing device, an index threshold wherein those entities of the plurality of the target entities having index values at least meeting the index threshold are likely to exhibit the behavior more frequently than a random sampling of a plurality of training entities.

2. The method of claim 1, wherein identifying the behavior discrimination threshold for each variable further comprises identifying, by the processing device, the behavior discrimination threshold based on training data for the plurality of training entities.

3. The method of claim 2, wherein identifying the behavior discrimination threshold for each variable further comprises:
    determining, by the processing device based on the training data, a distribution for the variable based on that portion of the plurality of training entities exhibiting the behavior; and
    selecting, by the processing device, as the behavior discriminating threshold a value of the distribution that delineates at least a portion of that portion of the plurality of training entities exhibiting the behavior.

4. The method of claim 3, wherein the value of the distribution that delineates at least a portion of those entities of the plurality of training entities exhibiting the behavior is determined according to a mean value of the distribution extended by a delta value.

5. The method of claim 4, wherein the delta value is one standard error of the distribution.

6. The method of claim 1, wherein determining the index threshold further comprises selecting the index threshold based on a candidate index value at which those entities of the plurality of target entities at least meeting the candidate index value exhibit the behavior more frequently by a desired factor as compared to the random sampling of the plurality of training entities.

7. The method of claim 1, wherein the plurality of training entities and the plurality of target entities are subscribers to a service and the behavior is discontinuing the service.

8. The method of claim 1, further comprising:
identifying, by the processing device, those entities of the plurality of target entities having an index value at least meeting the index threshold to provide targeted entities; and
taking at least one action relative to the targeted entities to affect the likelihood that the targeted entities will exhibit the behavior.

9. An apparatus for identifying entities likely to engage in a behavior, comprising:
a processor;
a storage device, operatively connected to the processing device and having stored thereon instructions that, when executed by the processor, cause the processor to:
identify a behavior discrimination threshold for each variable of a plurality of behavior variables;
for each entity of a plurality of target entities and for each variable of the plurality of behavior variables, determine that a variable value of the entity satisfies the behavior discrimination threshold for the variable to thereby identify the variable as an identifying variable for the entity;
for each entity of the plurality of target entities, determine an index value for the entity according to the identifying variables for the entity; and
determine an index threshold wherein those entities of the plurality of the target entities having index values at least meeting the index threshold are likely to exhibit the behavior more frequently than a random sampling of a plurality of training entities.

10. The apparatus of claim 9, wherein those instructions that, when executed by the processor, cause the processor to identify the behavior discrimination threshold for each variable are further operative to cause the processor to identify the behavior discrimination threshold based on training data for the plurality of training entities.

11. The apparatus of claim 10, wherein those instructions that, when executed by the processor, cause the processor to identify the behavior discrimination threshold for each variable are further operative to cause the processor to:
determine, based on the training data, a distribution for the variable based on that portion of the plurality of training entities exhibiting the behavior; and
select as the behavior discriminating threshold a value of the distribution that delineates at least a portion of that portion of the plurality of training entities exhibiting the behavior.

12. The apparatus of claim 11, wherein those instructions that, when executed by the processor, cause the processor to identify the behavior discrimination threshold for each variable are further operative to cause the processor to:
determine the value of the distribution that delineates at least a half of that portion of the plurality of training entities exhibiting the behavior according to a mean value of the distribution extended by a delta value.

13. The apparatus of claim 12, wherein those instructions that, when executed by the processor, cause the processor to identify the behavior discrimination threshold for each variable are further operative to cause the processor to:
calculate a standard error of the distribution, wherein the delta value is the standard error.

14. The apparatus of claim 9, wherein those instructions that, when executed by the processor, cause the processor to determine the index threshold are further operative to cause the processor to:
select the index threshold based on a candidate index value at which those entities of the plurality of target entities at least meeting the candidate index value exhibit the behavior more frequently by a desired factor as compared to the random sampling of the plurality of training entities.

15. The apparatus of claim 9, wherein the plurality of training entities and the plurality of target entities are subscribers to a service and the behavior is discontinuing the service.

16. The apparatus of claim 9, wherein the storage device further comprises instructions that, when executed by the processor, cause the processor to:
identify those entities of the plurality of target entities having an index value at least meeting the index threshold to provide targeted entities; and
provide the targeted entities as output.

17. An apparatus for identifying entities likely to engage in a behavior, comprising:
at least one data source comprising data for a plurality of training entities and for a plurality of target entities; and
a behavior identification processor, implemented by at least one processing device, operative to:
identify a behavior discrimination threshold for each variable of a plurality of behavior variables;
determine, for each entity of the plurality of target entities and for each variable of the plurality of behavior variables, that a variable value of the entity satisfies the behavior discrimination threshold for the variable to thereby identify the variable as an identifying variable for the entity;
determine, for each entity of the plurality of target entities, an index value for the entity according to the identifying variables for the entity; and
determine an index threshold wherein those entities of the plurality of the target entities having index values at least meeting the index threshold are likely to exhibit the behavior more frequently than a random sampling of a plurality of training entities.

18. The apparatus of claim 17, wherein the at least one data source comprises a plurality of data sources.

* * * * *